United States Patent Office 3,751,441
Patented Aug. 7, 1973

---

3,751,441
PREPARATION OF FERROCENYLBUTADIENES
Dennis C. Van Landuyt, Auburn, Ala., assignor to the United States of America as represented by the Secretary of the Army
No Drawing. Filed June 15, 1971, Ser. No. 153,442
Int. Cl. C07f 15/02
U.S. Cl. 260—439 CY               8 Claims

ABSTRACT OF THE DISCLOSURE

The process of making ferrocenylalkadienes by reacting a ferrocene carbonyl compound with a Grignard reagent to produce an alkenol, and then reacting the ferrocenylalkenol in a dehydration reaction in the presence of diamylhydroquinone, benzene, and copper sulfate pentahydrate. A ferrocyenylalkadiene is recovered from this reaction. These ferrocenylalkadienes are used in the preparation of homopolymers for propellant applications, or they may be copolymerized with butadienes and used in solid propellant binders.

CROSS REFERENCE TO RELATED APPLICATION

This application is related to copending application Ser. No. 155,670, filed June 15, 1971.

BACKGROUND OF THE INVENTION

The ferrocenes are usually used in the liquid form as ballastic modifiers in solid propellant compositions and also serve as plasticizing agents. In the liquid stages, the additives exhibit inherent disadvantages that are characteristic of liquid additives such as loss by evaporation, migration, etc., and consequently, the propellant systems suffer when stored for long periods of time. Thus, a need exists for a modified form of ferrocene additive which form is not subject to loss by evaporation or migration when stored in a solid propellant composition.

Therefore, it is an object of this invention to provide a novel process by which ferrocenylalkadienes can be easily prepared and further processed into homopolymers and used in propellant applications.

Another object of this invention is to provide a novel process by which ferrocenylbutadienes can be easily prepared and then copolymerized with other butadienes to to form useful solid propellant binders.

SUMMARY OF THE INVENTION

In accordance with this invention, the novel process is provided for making ferrocenylalkadienes which includes reacting a ferrocene carbonyl compound with a Grignard reagent to form a ferrocenylalkenol. The ferrocenylalkenol is then dehydrated in the presence of diamylhydroquinone, benzene, and copper sulfate pentahydrate to form the desired ferrocenylalkadiene.

DETAILED DESCRIPTION OF THE INVENTION

The process for producing ferrocenylalkadienes according to this invention is as follows: to a ferrocene carbonyl compound in a minimum amount of anhydrous ethyl ether solution, add allylmagnesium bromide or chloride (Grignard reagent). The ferrocene carbonyl compound may be selected from aldehydes and ketones that contain from 11 to 20 carbon atoms. The temperature of the reaction mixture must be maintained below ether reflux temperature. After addition of the Grignard reagent is complete, the mixture is stirred for about 1 hour. The reaction mixture is then poured into ice water and neutralized with dilute hydrochloric acid. Next, extract with ethyl ether, dry extract over anhydrous sodium sulfate, filter, and finally strip solvent. A ferrocenylalkenol is obtained in excellent yield (yield depends upon dryness of ether). It has been found that it is not necessary to take the product through any purification steps.

The formed ferrocenylalkenol is added to benzene, diamylhydroquinone, and copper sulfate pentahydrate. This reaction mixture is allowed to reflux in a Dean-Stark apparatus until 18 parts (theoretical) of water are collected. The reaction mixture is then filtered, stripped of solvent and allowed to crystallize. Final purification is facilitated by passing the ferrocenylalkadiene through a silica gel column using benzene as the eludent. The eluded product yields approximately 50–60 percent.

A specific example of preparing 1-ferrocenyl-1,3-butadiene is set forth in the example below.

Example

In a 3-liter, two-neck flask equipped with mechanical stirrer and addition funnel, 304.5 g. (1.45 mole) of ferrocene aldehyde and 850 ml. of anhydrous ether were added. The aldehyde solution was then cooled to 0° C. by an external ice bath and was then reacted with allylmagnesium bromide. In the course of the reaction, a polymeric solid mass forms but is dissolved as excess Grignard reagent is added. 1700 ml. of 1.5 molar Grignard reagent was used. After the reaction was complete, the yellow slurry was poured into approximately 4 liters of ice slurry and neutralized with dilute hydrochloric acid. The ether solution was extracted and concentrated to give 320 grams of the title compound.

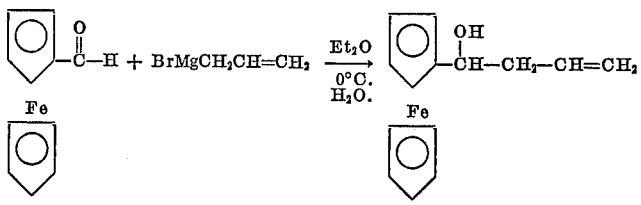

4-ferrocenyl-1-butene-4-ol

To 255 parts by weight 4-ferrocenyl-1-butene-4-ol are added the following: 600 parts by weight benzene, 0.5 part by weight diamylhydroquinone, and 10 parts by weight copper sulfate pentahydrate. This reaction mixture is allowed to reflux in a Dean-Stark apparatus until 18 parts (theoretical) of water are collected. The reaction mixture is then filtered, stripped of solvent and allowed to crystallize. Final purification is facilitated by passing the 1-ferrocenyl-1,3-butadiene through a silica gel column using benzene as eluent. Pure 1-ferrocenyl-1,3-butadiene has a melting point of 87–88° C.

The ferrocenylalkadienes according to this invention are very useful monomers in the preparation of homopolymers for propellant applications. In addition, the ferrocenylalkadienes copolymerize with butadienes to give ferrocenylalkadienes-butadiene copolymers which are useful solid propellant binders.

For specific use of ferrocenylbutadienes in a polymer or propellant composition, see copending application Ser. No. 155,670, filed June 15, 1971.

I claim:
1. A process for producing ferrocenylbutadiene comprising reacting 4-ferrocenyl-1-butene-4-ol in a dehydra- tion reaction in the presence of benzene, diamylhydroquinone, and copper sulfate pentahydrate to produce ferrocenylbutadiene.

2. A process for producing ferrocenylbutadiene as set forth in claim 1, wherein said ingredients as a reaction mixture are refluxed.

3. A process for producing ferrocenylbutadiene as set forth in claim 2, wherein said reaction mixture after refluxing is filtered, stripped of solvent, allowed to crystallize, and finally purified by passing through a silica gel column.

4. A process for producing ferrocenylbutadiene as set forth in claim 1, wherein said 4-ferrocenyl-1-butene-4-ol is present in an amount of about 255 parts by weight, wherein said benzene is present in an amount of about 600 parts by weight, wherein said diamylhydroquinone is present in an amount of about 0.5 part by weight, and wherein said copper sulfate pentahydrate is present in an amount of about 10 parts by weight.

5. A process for producing ferrocenylbutadiene as set forth in claim 1, wherein said 4-ferrocenyl-1-butene-4-ol is produced by reacting a ferrocene carbonyl compound with an allylmagnesium halide, said halide being selected from the group consisting of bromide and chloride.

6. A process for producing ferrocenylbutadiene as set forth in claim 4, wherein said 4-ferrocenyl-1-butene-4-ol has been produced by reacting ferrocene aldehyde with allylmagnesium halide, said halide being selected from the group consisting of bromide and chloride.

7. A process for producing ferrocenylbutadiene as set forth in claim 3, wherein said 4-ferrocenyl-1-butene-4-ol is produced by reacting a ferrocene carbonyl compound with an allylmagnesium halide said halide being selected from the group consisting of bromide and chloride.

8. A process for producing ferrocenylbutadiene as set forth in claim 3, wherein said 4-ferrocenyl-1-butene-4-ol is present in an amount of about 255 parts by weight, wherein said benzene is present in an amount of about 600 parts by weight, wherein said diamylhydroquinone is present in an amount of about 0.5 part by weight, and wherein said copper sulfate pentahydrate is present in an amount of about 10 parts by weight.

References Cited

UNITED STATES PATENTS

| 3,564,034 | 2/1971 | Combs et al. | 260—439 CY |
| 3,577,449 | 5/1971 | Ashmore | 260—439 CY |

OTHER REFERENCES

Morton: Laboratory Technique in Organic Chemistry, McGraw-Hill Book Co., New York, N.Y., 1938, p. 6.

Heilbron: Dictionary of Organic Compounds, Oxford Univ. Press, New York, N.Y., 1953, p. 709, vol. 2.

Mechtler et al.: Mh. Chem. Bond 97, 1966, pp. 754–763.

Huan-li Wu et al.: Izvestia Akad. Nauk., U.S.S.R., 1962, pp. 887–892.

DANIEL E. WYMAN, Primary Examiner

A. P. DEMERS, Assistant Examiner

U.S. Cl. X.R.

44—4; 149—19